United States Patent [19]

Leslie et al.

[11] 4,366,065

[45] Dec. 28, 1982

[54] SEPARATING PARTICLES FROM A LIQUID

[75] Inventors: Colin M. Leslie, Kelsall; James H. P. Watson, St. Austell; John A. Williams, Warrington, all of England

[73] Assignee: British Nuclear Fuels Limited, Risley, England

[21] Appl. No.: 323,698

[22] Filed: Nov. 20, 1981

Related U.S. Application Data

[63] Continuation of Ser. No. 113,605, Jan. 21, 1980, abandoned.

[30] Foreign Application Priority Data

Feb. 2, 1979 [GB] United Kingdom ............... 7903800

[51] Int. Cl.³ .............................................. C02F 1/48
[52] U.S. Cl. .................................. 210/695; 210/792; 210/222; 210/223; 210/269; 209/38; 209/233
[58] Field of Search ............... 210/695, 772, 791–798, 210/222, 223, 269, 275, 332, 333.01, 333.1; 209/38, 216, 223 R, 332, 233, 250, 380

[56] References Cited

U.S. PATENT DOCUMENTS

| | | | |
|---|---|---|---|
| 3,016,147 | 1/1962 | Cobb et al. | 210/275 |
| 3,349,918 | 10/1967 | Ike | 210/223 |
| 3,411,120 | 11/1968 | Miyata | 210/223 |
| 3,539,509 | 11/1970 | Heitmann | 210/222 |
| 3,869,390 | 3/1975 | Heitmann | 210/222 |
| 3,887,457 | 6/1975 | Marston | 210/222 |
| 3,979,288 | 9/1976 | Heitmann | 210/222 |
| 4,043,864 | 8/1977 | Heitmann | 210/222 |
| 4,116,839 | 9/1978 | Unkelbach | 210/222 |
| 4,147,632 | 4/1979 | Oder | 210/222 |

FOREIGN PATENT DOCUMENTS

| | | | |
|---|---|---|---|
| 572294 | 10/1945 | United Kingdom | 210/222 |
| 300419 | 9/1971 | U.S.S.R. | 210/222 |

Primary Examiner—Ernest G. Therkorn
Attorney, Agent, or Firm—William R. Hinds

[57] ABSTRACT

A method and apparatus for separating particles suspended in a liquid from the liquid. A flow of the liquid is passed through a filter bed of ferromagnetic bodies which acts as a coarse filter to trap the larger particles in the flow. The filter bed is arranged within a truncated cone between the poles of an electromagnet. To cleanse the bed and flush out the trapped particles a wash liquid is passed through the bed and the electromagnet is energized to levitate the bed to thereby allow the wash liquid to remove the particles. The liquid flow from the coarse filter can be passed to a high gradient magnetic separator at which remaining small particles in the flow are filtered magnetically.

6 Claims, 1 Drawing Figure

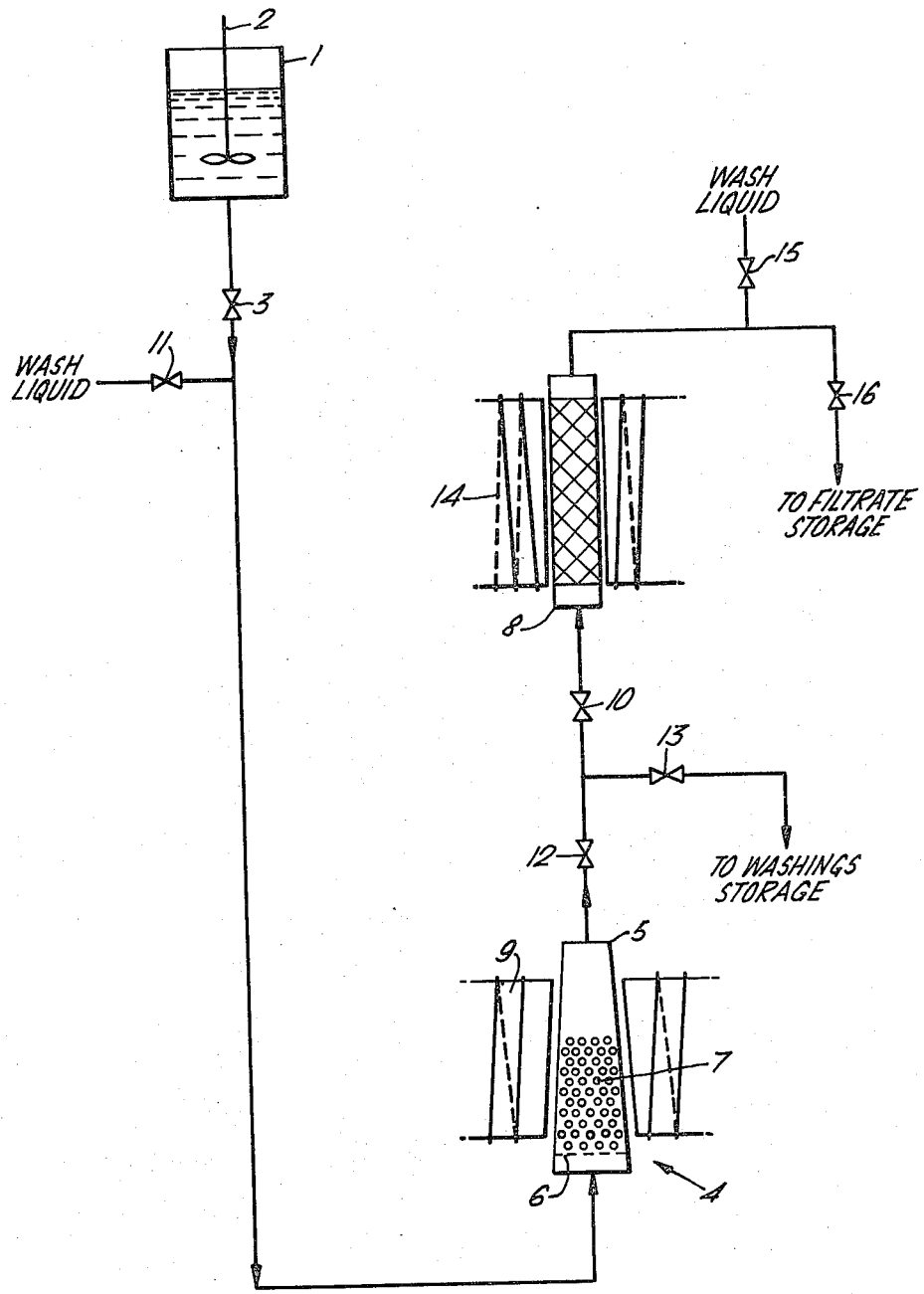

SEPARATING PARTICLES FROM A LIQUID

This is a continuation of application Ser. No. 113,605, filed Jan. 21, 1980, now abandoned.

BACKGROUND OF THE INVENTION

The present invention concerns the separation of particles from a liquid.

It is known to effect separation of particles suspended in a liquid by magnetic filtration. In such magnetic filters the liquid is passed through a chamber containing a bed of particles of magnetisable material. An electromagnetic coil about the chamber is energised to magnetise the bed to thereby attract and retain the particles suspended in the liquid flow through the bed. After filtration, the trapped particles can be removed by isolating the electromagnetic coil and scavenging the chamber with a wash liquid whereby to agitate the bed and flush out the trapped particles.

The present invention seeks to provide a method and apparatus for filtering which enables the bed to be cleaned and flushed more quickly and with smaller quantities of wash liquid than hitherto.

SUMMARY OF THE INVENTION

According to one aspect of the present invention a method of separating particles comprises passing a flow of the liquid containing the particles through a filter bed of individual bodies, trapping the particles in the bed and then discontinuing the liquid flow, magnetically levitating the bed while passing a wash liquid flow therethrough to flush the particles out of the bed.

According to another aspect of the present invention apparatus for separating particles from a liquid comprises a chamber containing a filter bed of individual bodies, first flow path for passing the liquid through the chamber to trap the particles in the bed, second flow path for passing a wash liquid through the chamber, an electromagnet disposed outside the chamber and operable upon flow of the wash liquid to levitate the filter bed to thereby flush out the trapped particles.

The chamber is conveniently in the form of a truncated cone and the bodies may be supported on a mesh screen at the base of the chamber. A further electromagnet may be located so that the filter bed is located between its poles so that when the further electromagnet is energised magnetic particles are attracted to the ferromagnetic bodies and retained by them.

The bodies are preferably spherical and may be of iron or mild steel. When the liquid to be used is corrosive the bodies may be coated with a material which is inert to the liquid. For use with nitric acid the bodies may be coated with gold or platinum.

The apparatus may be used as a prefilter for a high gradient magnetic separator.

DESCRIPTION OF THE DRAWING

The invention will be illustrated by the following description of an assembly for removing solid particles from a liquid. The description is given by way of example only and has reference to the single FIGURE of the accompanying drawing which is a diagrammatic representation of the apparatus.

DESCRIPTION OF THE PREFERRED EMBODIMENTS

A liquid containing solid particles is placed in a tank 1 which has a stirrer 2 which keeps the solid particles in suspension. The liquid is fed from the tank 1 through a valve 3 to a filter 4 which comprises chamber 5 in the form of a truncated cone having a mesh screen 6 near its base on which is supported a filter bed of packed bodies 7 which are ferromagnetic and are preferably spherical in shape. The filter bed removes large particles from the liquid which then passes to a high gradient magnetic separator 8 in which smaller particles are magnetically filtered.

The chamber 5 is surrounded by an electromagnet 9 which is so placed that the mesh screen 6 is below the lower end of the pole gap and the filter bed extends upwards to about the centre of the pole gap. In normal use the electromagnet is not energised and particles which are too large to pass between the packed bodies are retained by the filter. When it is desired to remove the retained particles from the filter bed valves 3 and 10 are closed and valves 11, 12, 13 opened to allow a supply of washing water to be passed through the filter bed. Energisation of the electromagnet causes the ferromagnetic bodies to be lifted away from the mesh 6 by the attraction of the magnetic field between the poles. As the bodies are lifted any particles retained by the filter bed are dislodged and may be removed by the washing water. The tapered chamber prevents the filter bed moving up as a plug and causes the bodies to move over one another as they are lifted. This relative movement of the bodies enables the retained particles to be flushed from the filter bed quickly with a small quantity of washing water. This is important in that it reduces the down time of the apparatus and in plant in which the particles being separated are radioactive it reduces the amount of radioactive liquid effluent which is produced during the washing of the filter bed. When the washing is complete the electromagnet is de-energised and the bodies fall back on to the mesh screen 6 under gravity to reform the filter bed.

The magnetic field required to levitate the bodies is in the order of 2000 Gauss when the bodies are spheres of ⅛ inch (3.18 millimeters) diameter and the chamber 5 has a mean diameter of 1¼ inches (32 millimeters). The bodies may conveniently be of iron or mild steel and may be provided with a protective coating to prevent attack on the bodies by the liquid containing the particles. In one application of the present invention the apparatus is used to remove undissolved particles from the liquid leaving a dissolver for irradiated nuclear fuel. This liquid has a high nitric acid content and so the bodies have to be protected by a coating of material which is resistant to nitric acid such as gold or platinum.

In the FIGURE the washing water is shown flowing through the chamber 5 in the same direction as the liquid. If desired a reverse flow of washing water may be employed.

The solution leaving the filter bed 7 which has removed the larger particles from the solution then passes to the high gradient magnetic separator 8 where magnetic particles carried by the liquid are retained on a matrix of magnetic material. In one embodiment the matrix comprises fine wires of a ferro-magnetic material. In this case the filter bed 7 acts as a prefilter to prevent the large particles causing premature clogging of the matrix. In a second embodiment the matrix within the magnetic separator comprises ferromagnetic bodies similar in composition but conveniently smaller in diameter than those used for the filter bed 7. The bodies are normally located between the poles of a powerful electromagnet 14 so that any magnetic particles are attracted to and retained on the bodies by the magnetic field. The separator 8 may have a second electromagnet (not shown) which operates in a similar manner to that described hereinbefore to levitate the bodies to facilitate the cleaning of the matrix. This cleaning occurs when the electromagnet 14 is de-energised and the particles are no longer attracted to the bodies. In this second case the chamber in which the bodies are retained may be in the shape of a truncated cone.

To wash the magnetic separator 8 the magnet 14 is de-energised the valves 12 and 16 are closed and the valves 15, 10 and 13 are opened to allow washing water to wash through the matrix to remove particles which are no longer attracted to and retained by the bodies.

We claim:

1. A method of separating particles suspended in a liquid which comprises locating electromagnet means outside a chamber containing a filter bed of individual bodies, fixedly positioning the electromagnet means relative to the bed with the bed arranged in the pole gap of the magnet and the magnet extending upwardly beyond the bed such that the magnet surrounds the bed and is offset axially relative to the bed so as to levitate the bodies upon energization of the fixedly positioned electromagnet means, passing a flow of liquid containing suspended particles through the bed with the electromagnet means de-energized so as to trap the particles in the bed, discontinuing the liquid flow, levitating the bed by energizing said fixedly positioned electromagnet means and passing a wash liquid through the levitated bed to flush trapped particles out of the bed.

2. Apparatus for separating particles suspended in a liquid, comprising a chamber, a filter bed of individual bodies within the chamber, said bodies being capable of being levitated by electromagnetic means, a first flow path for passing the liquid containing the suspended particles through the chamber to trap the particles in the bed, a second flow path for passing a washing liquid through the chamber, fixedly positioned electromagnet means disposed outside the chamber and positioned relative to the bed with the bed arranged in the pole gap of the magnet and the magnet extending upwardly beyond the bed such that the magnet surrounds the bed and is offset axially relative to the bed such as to levitate the individual bodies within the chamber upon energization of the fixedly positioned electromagnet means during flow of washing liquid through the chamber.

3. An apparatus according to claim 2 in which the chamber comprises an upright truncated cone and the filter bed is supported on a screen at the base of the conical chamber.

4. Apparatus according to claim 2 in which the bed comprises ferromagnetic bodies.

5. Apparatus according to claim 4 in which a protective anti-corrosion coating is applied to the ferromagnetic bodies.

6. Apparatus according to claim 2 in which the first flow path includes a high gradient magnetic separator downstream from the chamber.

* * * * *